US007735015B2

(12) United States Patent
Gardas et al.

(10) Patent No.: US 7,735,015 B2
(45) Date of Patent: Jun. 8, 2010

(54) METHOD AND SYSTEM FOR GENERATION OF DELEGATING IMPLEMENTATION FOR IDL INTERFACES USING INHERITANCE

(75) Inventors: Karel Gardas, Roznov pod Radhostem (CZ); Tomas Zezula, Novy Malin (CZ); Dusan Balek, Bukova (CZ)

(73) Assignee: Oracle America, Inc., Redwood Shores, CA (US)

( * ) Notice: Subject to any disclaimer, the term of this patent is extended or adjusted under 35 U.S.C. 154(b) by 1346 days.

(21) Appl. No.: 10/883,104

(22) Filed: Jul. 1, 2004

(65) Prior Publication Data

US 2004/0243974 A1 Dec. 2, 2004

Related U.S. Application Data

(63) Continuation of application No. 09/860,654, filed on May 18, 2001, now Pat. No. 6,788,317.

(51) Int. Cl.
*G06F 3/00* (2006.01)
(52) U.S. Cl. .................. 715/762; 715/764; 715/765; 717/106; 717/137
(58) Field of Classification Search ................ 715/762, 715/764, 765, 783; 707/103, 3; 717/104, 717/106, 137; 709/227
See application file for complete search history.

(56) References Cited

U.S. PATENT DOCUMENTS 5,793,965 A * 8/1998 Vanderbilt et al. .......... 709/203
5,848,273 A * 12/1998 Fontana et al. ............. 717/108
6,336,118 B1 * 1/2002 Hammond ............... 707/103 Y
6,473,748 B1 * 10/2002 Archer ....................... 706/45

OTHER PUBLICATIONS

David Alex Lamb ( ACM Tranactions on Programming Language and Sytems; IDL sharing intermediate representations; vol. 9 No. 3 Jul. 1987, pp. 297-318).*
Lamb (npl: ACM Transactions on Programming Language and Systems; IDL sharing intermeddiate representations; vol. 9 No. 3 1987 pp. 297-318) previously provided.*

* cited by examiner

*Primary Examiner*—William L Bashore
*Assistant Examiner*—Sherrod Keaton
(74) *Attorney, Agent, or Firm*—Osha • Liang LLP

(57) ABSTRACT

A method of generating an interface definition language (IDL) interface involves identifying parents for the IDL interface, identifying parent interfaces associated with the parents, wherein the parent interfaces include concrete parent interfaces, computing a set of directly implemented methods for the parent interfaces, generating an implementation of the IDL interface with the concrete parent interfaces to generate a plurality of delegation fields, generating an initialization method and a setting method for each of the plurality of delegation fields, and generating indirectly implemented methods with a body that delegates functionality to one of the plurality of delegate fields.

14 Claims, 16 Drawing Sheets

```
Source Editor [BImpl]
1 //
2 // This file was generated from ttt.idl
3 //
4
5 package idls_local. AAAnew_impl_generator. simple;
6
7 //
8 // IDL : B ; 1.0
9 //
10
11 public class BImpl extends BPOA {
12     private idls_local. AAAnew_Impl_genarator. simple. AImpl _M_variable_of_type_A;
13
14     public BImpl () {
15        this _initialize_inheritance_tree ();
16     }
17
18     public void op2 () {
19        throw new UnsupportedOperationException ();
20     }
21
22     public void _initialize_inheritance_tree () {
23        _M_variable_of_type_A = new idls_local. AAAnew_impl_generator.simple.AImpl ();
24
25     }
26
27  public void set_parent_of_type_A (idls_local. AAAnew_impl_generator.simple.AImpl __value) {
28        _M_variable_of_type_A = __value;
29     }
30
31     public void op() {
32        _M_variable_of_type_A.op ();
33     }
34
35
36 }
37

22:22  INS
AImpl  BImpl  ttt
```

METHOD AND SYSTEM FOR GENERATION OF DELEGATING IMPLEMENTATION FOR IDL INTERFACES USING INHERITANCE

CROSS-REFERENCE TO RELATED APPLICATIONS

This application is a continuation of U.S. patent application Ser. No. 09/860,654, filed on May 18, 2001 now U.S. Pat. No. 6,788,317, and claims the benefit, pursuant to 35 U.S.C. §120, of that application.

BACKGROUND

Applications developed using distributed objects such as Common Object Request Broker Architecture (CORBA) naturally lend themselves to multi-tiered architecture, fostering a neat separation of functionality. A three-tiered application has a user interface code tier, a computation code (or business logic) tier, and a database access tier. All interactions between the tiers occur via the interfaces that all CORBA objects publish. FIG. 1 illustrates the transition from monolithic applications to multi-tiered, modular applications. A first generation system (2) has a graphical user interface (GUI) (8), a business logic (10), and a data store (12) all combined into one monolithic application. A next generation system (4) has the GUI (8) and the business logic (10) as one application with an interface to the data store (12). A latest generation system (6) has three distinct tiers. A first tier or user interface (UI) tier (20) includes one or more GUI (8), which interface with one or more service logic (13) in a second tier or service tier (22). The service logic (13) in the service tier (22) interfaces with other service logic (13), one or more GUI (8), and one or more data sources (14). A third tier or data store tier (24) includes one or more data sources (14), which interface with one or more service logic (13).

The UI tier is the layer of user interaction. The focus is on efficient user interface design and accessibility. The UI tier can reside on a user desktop, on an Intranet, or on the Internet. Multiple implementations of the UI tier may be deployed accessing the same server. The UI tier usually invokes methods on the service tier and, therefore, acts as a client. The service tier is server-based code with which client code interacts. The service tier is made up of business objects (CORBA objects that perform logical business functions, such as inventory control, budget, sales order, and billing). These objects usually invoke methods on the data store tier objects. The data store tier is made up of objects that encapsulate database routines and interact directly with the database management system product or products.

CORBA is the standard distributed object architecture developed by an Object Management Group (OMG) consortium. The mission of the OMG is to create a specification of architecture for an open software bus, or Object Request Broker (ORB), on which object components written by different vendors can interoperate across networks and operation systems.

The ORB is middleware that establishes the client-server relationships between objects by interacting and making requests to differing objects. The ORB sits between distributed (CORBA) objects in the second tier of the three tier architecture and operates as a class library enabling low-level communication between parts (objects) of CORBA applications. Programmers usually write applications logic in CORBA and the application logic is then connected to the data store by using some other application, e.g., ODBC, JDBC, proprietary, etc. Usually only objects in the application logic communicate using the ORB. Using the ORB, a client transparently invokes a method on a server object, which can be on the same machine or across a network. The ORB intercepts a call and is responsible for finding an object that can implement a request, pass the object a plurality of parameters, invoke the method, and return the results. The client does not have to be aware where the object is located, the programming language of the object, the operating system of the object, or any other system aspects that are not part of the interface of the object. In other words, the application logic can be run on many hosts in many operating systems and parts of the application logic can be written in different computer languages.

The diagram, shown in FIG. 2, shows a method request (30) sent from a client (32) to an instance of a CORBA object implementation, e.g., servant (36) (the actual code and data that implements the CORBA object) in a server (34). The client (32) is any code that invokes a method on the CORBA object. The client (32) of the CORBA object has an object reference (38) for the object and the client (32) uses this object reference (38) to issue method request (30). If the server object (36) is remote, the object reference (38) points to a stub function (40), which uses the ORB machinery (42) to forward invocations to the server object (36). The stub function (40) encapsulates the actual object reference (38), providing what seems like a direct interface to the remote object in the local environment. The stub function (40) uses the ORB (42) to identify the machine that runs the server object and, in turn, asks for that machine's ORB (44) for a connection to the object's server (34). When the stub function (40) has the connection, the stub function (40) sends the object reference (38) and parameters to the skeleton code (46) linked to an implementation of a destination object. The skeleton code (46) transforms the object reference (38) and parameters into the required implementation-specific format and calls the object. Any results or exceptions are returned along the same path.

The client (32) has no knowledge of the location of the CORBA object, implementation details of the CORBA object, or which ORB (44) is used to access the CORBA object. A client ORB (42) and a server ORB (44) communicate via the OMG-specified Internet InterORB Protocol (IIOP) (48). The client (32) may only invoke methods that are specified in the interface of the CORBA object. The interface of the CORBA object is defined using the OMG Interface Definition Language (IDL). CORBA objects can be written in any programming language for which there is mapping from IDL to that language (e.g., Java™, C++, C, Smalltalk, COBOL, and ADA). The IDL defines an object type and specifies a set of named methods and parameters, as well as the exception types that these methods may return. An IDL compiler translates the CORBA object's interface into a specific programming language according to an appropriate OMG language mapping.

Referring to FIG. 2, the stub files (40) and skeleton files (46) are generated by an IDL compiler for each object type. Stub files (40) present the client (32) with access to IDL-defined methods in the client programming language. The server skeleton files (46) figuratively glue the object implementation to the ORB (44) runtime. The ORB (44) uses the skeletons (46) to dispatch methods to the servants (36).

All CORBA objects support an IDL interface. The IDL interface defines an object type and can inherit from one or more other interfaces. The IDL syntax is very similar to that of Java™ or C++. The IDL is mapped into each programming language to provide access to object interfaces from that particular language. Using an IDL compiler of a CORBA implementation for Java™, the IDL interfaces are translated to Java™ constructs according to IDL to Java™ language mapping. For each IDL interface, IDL compiler generates a Java™ interface, classes, and other ".java" files needed, including the stub files and the skeleton files.

As a general guide, creating a CORBA-based distributed application has five steps as shown in FIG. 3. The first step is to define a remote interface (Step 50). The interface is defined using the IDL. Also, by using the IDL, the possibility exists to implement clients and servers in any other CORBA-compliant language. If the client is being implemented for an existing CORBA service, or the server for an existing client, the IDL interfaces come from the implementer, e.g., a service provider or vendor. The IDL compiler is then run over those interfaces.

Referring to FIG. 3, the second step is to compile the remote interface (Step 52). When the IDL compiler is run over the interface definition file, the Java™ version of the interface is generated along with class code files for the stubs and skeletons that enable applications to hook into the ORB.

The third step is to implement the server (Step 54). Once the IDL compiler is run, the skeletons generated by the compiler are used to put together the server application. In addition to implementing the methods of the remote interface, the server code includes a mechanism to start the ORB and wait for invocation from a remote client.

The fourth step is to implement the client (Step 56) as shown in FIG. 3. Similarly to the implementation of the server, the stubs generated by the IDL compiler are used as the basis of the client application. The client code builds on the stubs to start the ORB, obtain a reference for the remote object, and call the method.

The fifth step is to start the application (Step 58). Once the server and client have been implemented and the server is started, the client is run.

In certain circumstances, a form of inheritance or delegation is involved in the CORBA-based distributed application development process. Inheritance can take several forms, including single inheritance and multiple inheritance. Single inheritance is explained by the following example. An Object A implements a Method A. If Object B is formed by inheriting from Object A, then Object B inherits all of the functionality of Object A such that Object B now implements Method A. Furthermore, the declaration of Object B need not contain any source code related to Method A.

Referring to FIG. 4, in this example of normal single inheritance, interfaces are defined in the IDL (Interface Definition Language) as interface A (144) and interface B (145). The IDL compiler generates skeleton classes APOA (142) and BPOA (143). The Implementation Generator generates implementation classes AImpl (140) and BIpml (141). In this example, operations operation_A( ) (147) in AImpl (140) and operation_A( ) (148) and operation_B( ) (149) in BImpl (141) are empty and the developer adds functionality into these methods.

An object has multiple inheritance if the object inherits from more than one other object. For example, Object A implements Method A and Object B implements Method B. Object C can be formed from Object A and Object B such that Object C implements Method A and Method B. Further, the declaration of Object C need not contain any code that relates to Method A or Method B.

Delegation can take several forms, including static delegation and virtual delegation. With static delegation, methods call a method directly on the object that implements the delegated method directly. For example, an Object C is said to delegate to Objects A and B if instead of inheriting from the objects the object uses a actual separate instances of Objects A and B to perform a method implementation. With, virtual delegation, a method calls a method implemented on the most derived parent object that implements the delegated method.

As illustrated in FIG. 5, Forte™ for Java™ products (90), formerly called NetBeans, are visual programming environments written entirely in Java™. These products are commonly regarded as the leading Integrated Development Environment (IDE). IDEs are easily customizable and extensible, as well as platform independent. Forte™ for Java™ (90) includes a Form Editor (92), an integrated full-featured text editor (94), a debugger (98), and a compiler (100). Forte™ for Java™ (90) is also completely modular. Forte™ for Java™ (90) is built around a set of Open Application Programming Interface (API's), which allow it to be easily extensible. This means that the IDE functionality for editing, debugging, GUI generation, etc. is represented in modules that can be downloaded and updated dynamically as is illustrated in FIG. 5. Instead of waiting for a completely new release, as soon as new versions (104) or new modules (106) are available, users can update that individual version or module via the Update Center (102).

SUMMARY

In general, in one aspect, the present invention involves a method of generating an interface definition language (IDL) interface. The method involves identifying parents for the IDL interface, identifying parent interfaces associated with the parents, wherein the parent interfaces include concrete parent interfaces, computing a set of directly implemented methods for the parent interfaces, generating an implementation of the IDL interface with the concrete parent interfaces to generate a plurality of delegation fields, generating an initialization method and a setting method for each of the plurality of delegation fields, and generating indirectly implemented methods with a body that delegates functionality to one of the plurality of delegate fields.

In general, in one aspect, the present invention involves a method of generating an interface definition language (IDL) interface. The method involves identifying parents for the IDL interface, identifying parent interfaces associated with the parents, wherein the parent interfaces includes concrete parent interfaces, computing a set of directly implemented methods for the parent interfaces, generating an implementation of the IDL interface with the concrete parent interfaces to generate a plurality of delegation fields, generating an initialization method and a setting method for each of the plurality of delegation fields, and generating indirectly implemented methods with a body that delegates functionality to one of the plurality of delegate fields. The indirectly implemented methods are generated to guarded blocks. Generating the body includes generating a full body implementation for each of the indirectly implemented methods, wherein the full body implementation includes delegation source code, a delegation object attribute, and an initialize inheritance tree method. The type of delegation is one selected from the group including none, static delegation, and virtual delegation.

In general, in one aspect, the present invention involves a computer system adapted to generate an interface definition language (IDL) interface. The computer system includes a processor, a memory element, and software instructions. The software instructions enable the computer under control of the processor, to perform identifying parents for the IDL interface, identifying parent interfaces associated with the parents, wherein the parent interfaces include concrete parent interfaces, computing a set of directly implemented methods for the parent interfaces, generating an implementation of the IDL interface with the concrete parent interfaces to generate a plurality of delegation fields, generating an initialization method and a setting method for each of the plurality of delegation fields, and generating indirectly implemented methods with a body that delegates functionality to one of the delegate fields.

In general, in one aspect, the present invention involves a system for generating an implementation for an interface definition language (IDL) interface, The system includes means for identifying parents for the IDL interface, means for identifying parent interfaces associated with the parents, wherein the parent interfaces include concrete parent interfaces, means for computing a set of directly implemented methods for the parent interfaces, means for generating an implementation of the IDL interface with the concrete parent interfaces to generate a plurality of delegation fields, means for generating an initialization method and a setting method for each of the plurality of delegation fields, and means for generating indirectly implemented methods with a body that delegates functionality to one of the plurality of delegate fields.

In general, in one aspect, the present invention involves a method for generating an interface definition language interface (IDL). The method involves generating at least one directly implemented method for each of a plurality of parent interfaces, determining at least one inheritance relationship among the plurality of parent interfaces; generating at least one delegation field using the at least one inheritance relationship, determining a type of delegation to apply to the at least one delegation field, generating at least one delegation method configured to delegate control to the at least one delegation field in manner defined by the type of delegation. The at least one delegation field to which control is delegated is determined using the at least one inheritance relationship.

Other aspects and advantages of the invention will be apparent from the following description and the appended claims.

BRIEF DESCRIPTION OF DRAWINGS

FIG. 14 illustrates a computer screen shot within an IDE in accordance with one or more embodiments of the present invention.

DETAILED DESCRIPTION

Figure 1:
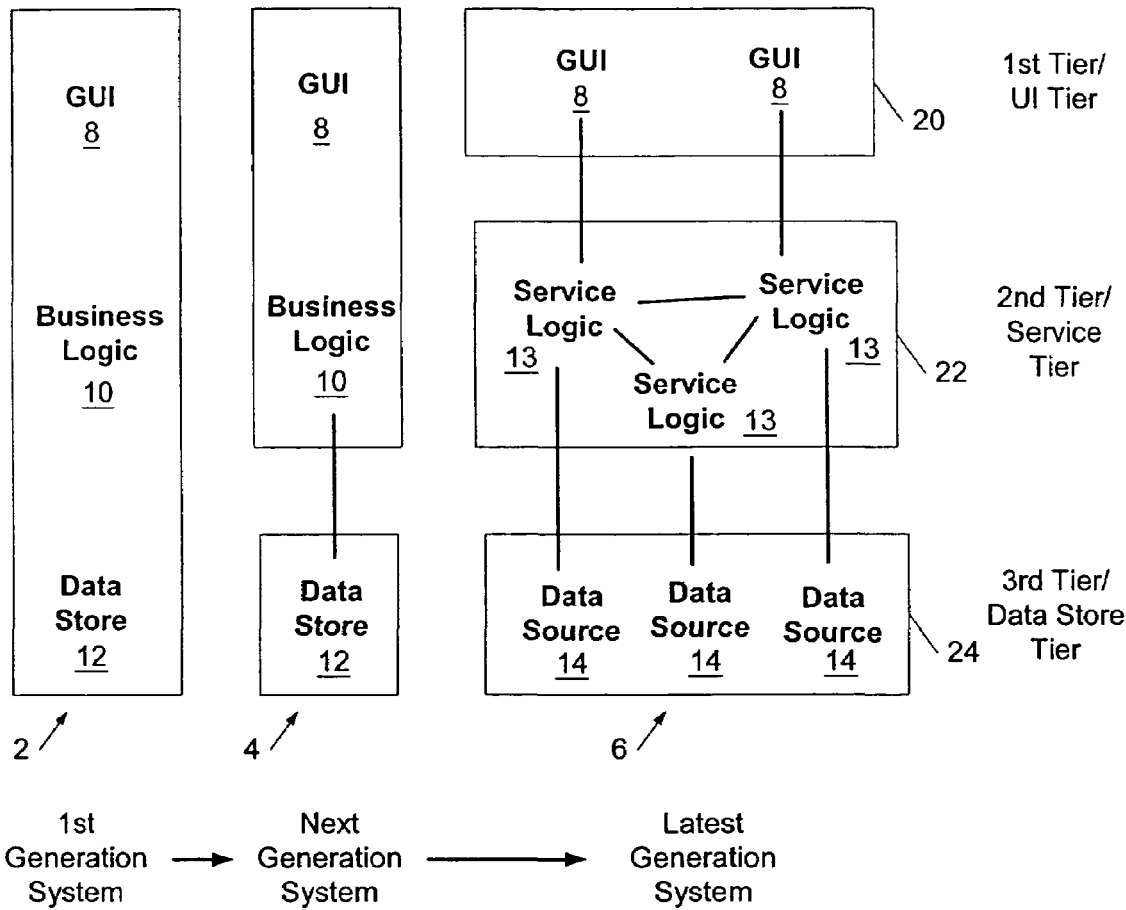
FIG. 1 illustrates the transition from monolithic applications to multi-tiered, modular applications.
Figure 2:
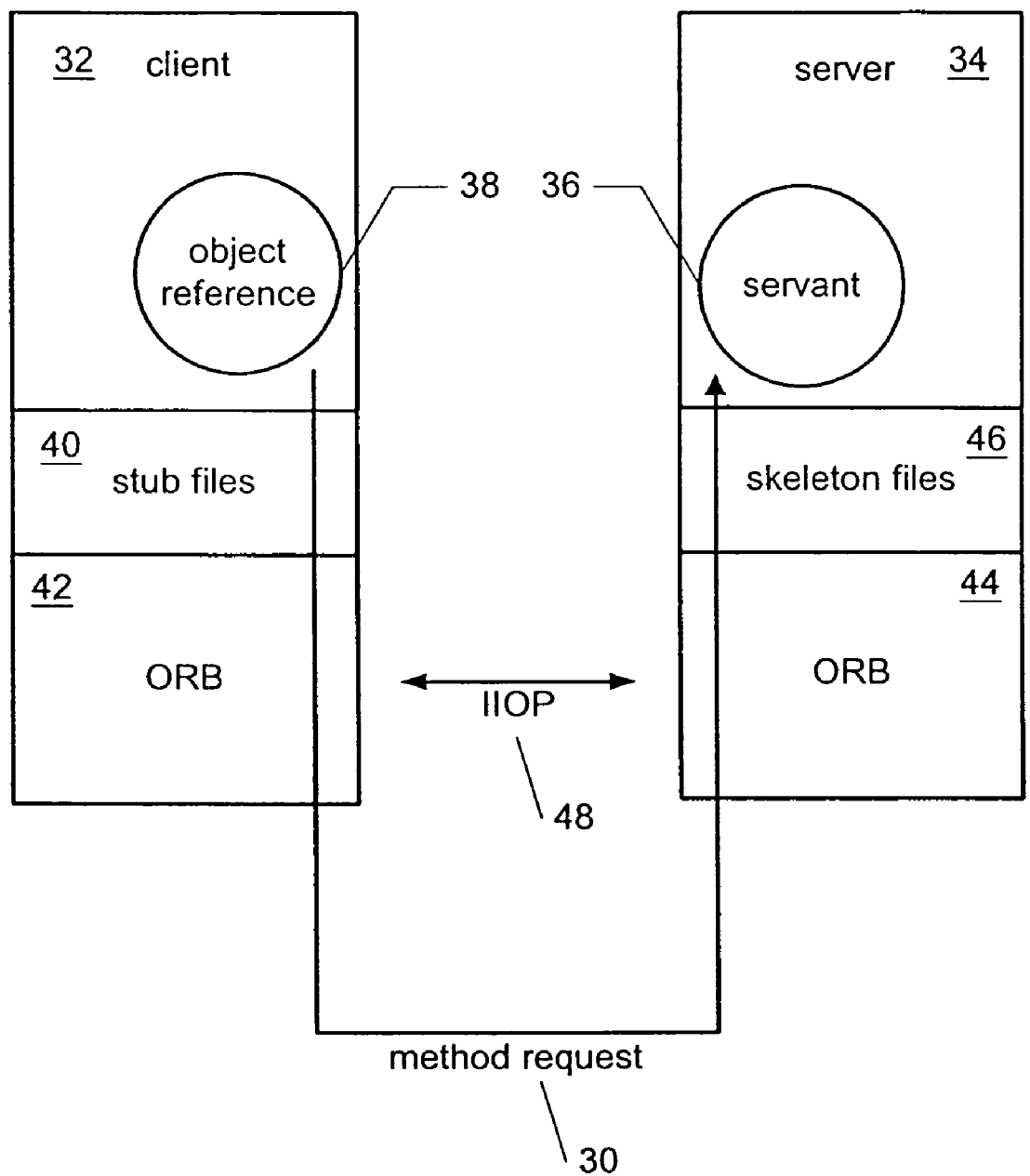
FIG. 2 illustrates a method request sent from a client to a CORBA object implementation in a server.

Specific embodiments of the invention will now be described in detail with reference to the accompanying figures. Like elements in the various figures are denoted by like reference numerals for consistency.

Figure 6:
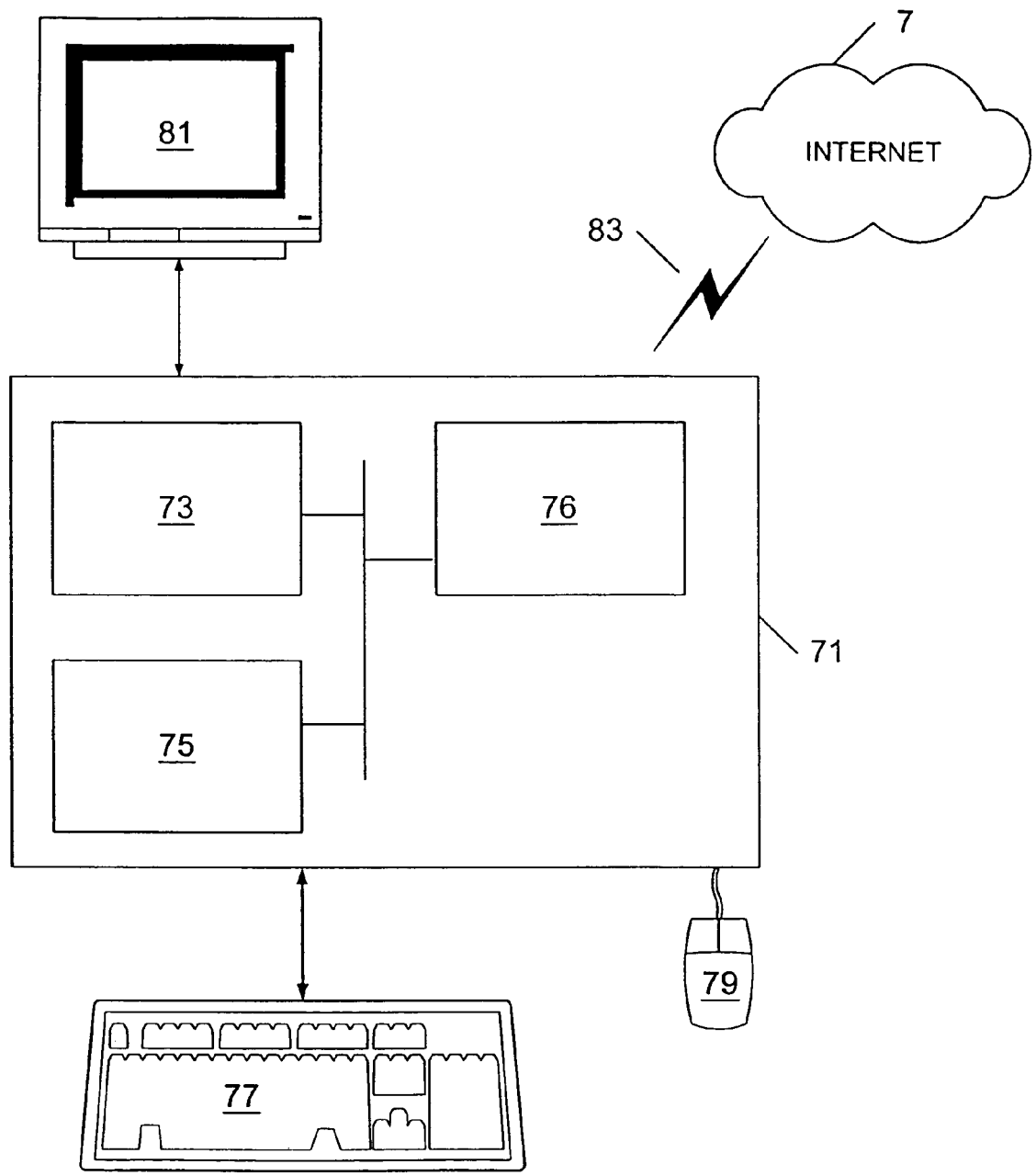
FIG. 6 illustrates a typical computer and its components.

The invention described here may be implemented on virtually any type computer regardless of the platform being used. For example, as shown in FIG. 6, a typical computer (71) includes a processor (73), an associated memory element (75), a storage device (76), and numerous other elements and functionalities typical to today's computers (not shown). The computer (71) may also include input means, such as a keyboard (77) and a mouse (79), and an output device, such as a monitor (81). Those skilled in the art will appreciate that these input and output means may take other forms. Computer (71) is connected via a network connection (83) to the Internet (7).

Figure 3:
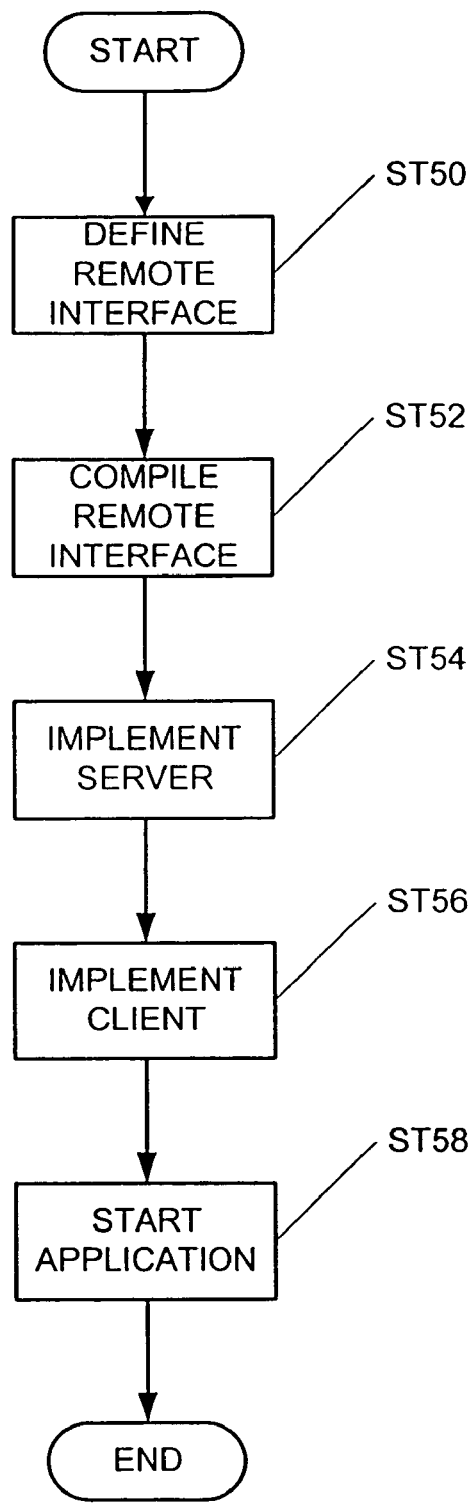
FIG. 3 illustrates a flowchart of the creation of a distributed object application using CORBA implementation.
Figure 4:
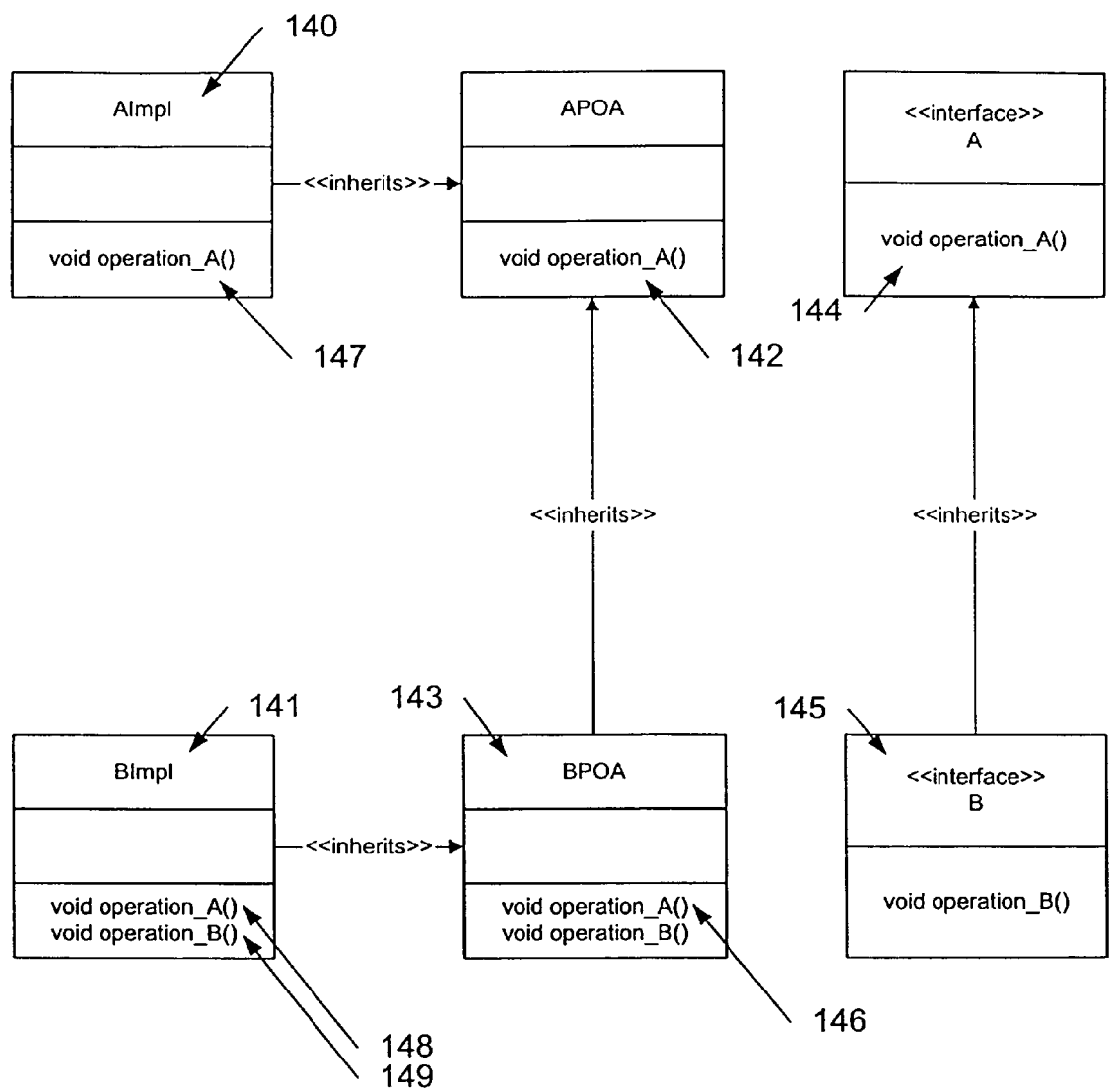
FIG. 4 is a block diagram showing normal single inheritance.

As discussed above and shown in FIG. 3, development of CORBA object applications starts with a developer defining remote interface(s) (Step 50) of CORBA server objects using the IDL which is part of the CORBA specification. Next, the description of interface(s) is compiled using the IDL compiler (Step 52) into constructs in a target computer language. Mapping of the IDL constructs into constructs in the target language is specified by the CORBA specification. In the case of the CORBA implementation written in Java™, these constructs are classes in Java™ and provide all necessary functionality for communicating over the ORB. The third and fourth steps in writing the CORBA application is writing implementation of defined interface(s) for the server (Step 54) and the client (Step 56). Writing the implementation is done in the target language and usually extends constructs produced by the IDL compiler. CORBA implementation written in Java™ requires the implementation be written with a new class for every interface that extends or implements some generated class.

Figure 7:
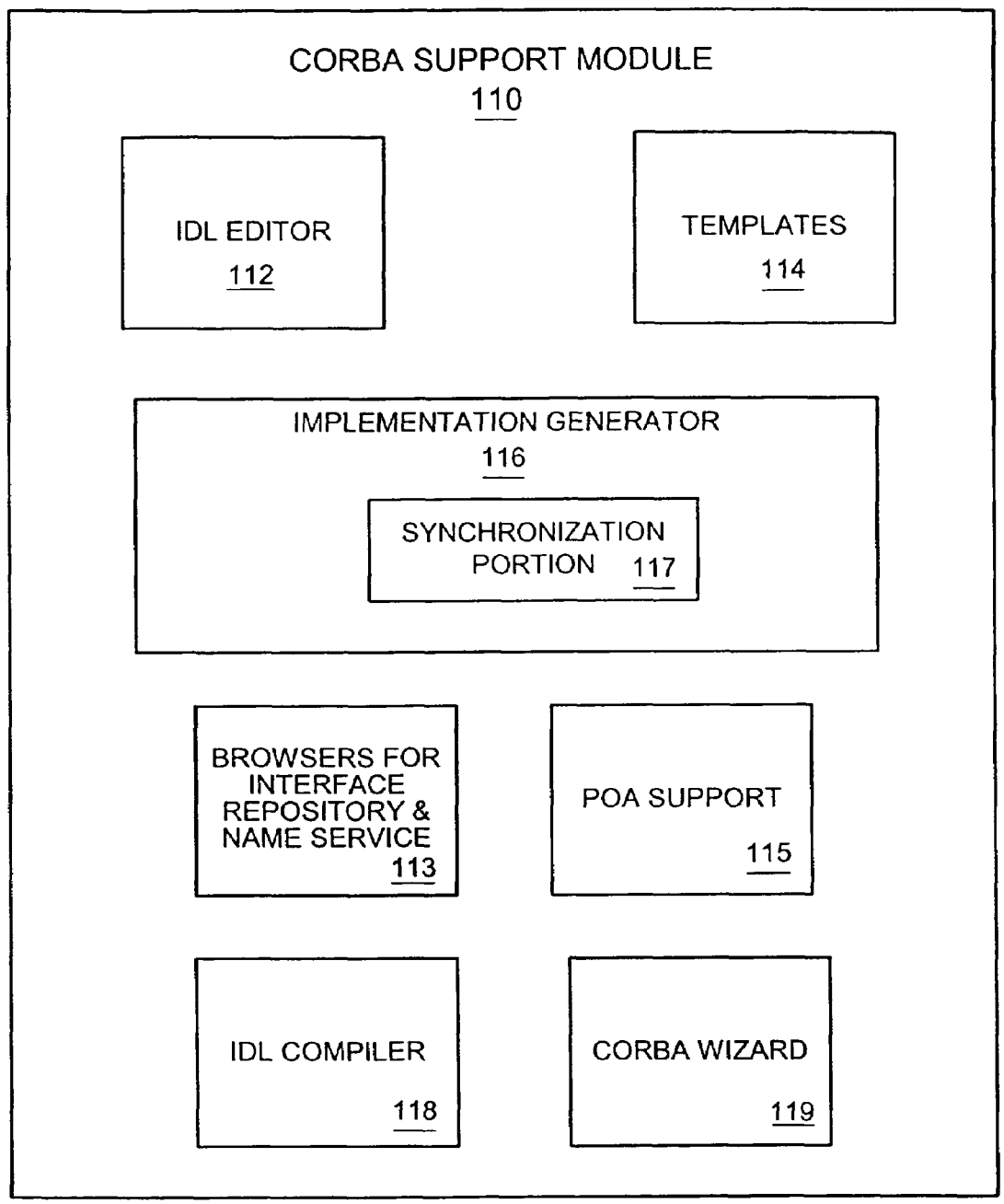
FIG. 7 illustrates a CORBA support module for an IDE in accordance with one or more embodiments of the present invention.

Returning to the Forte™ for Java™ IDE, a CORBA support module (110) as shown in FIG. 7 has been-created to be used within Forte™ for Java™ or any other IDE to develop, test, and debug any kind of CORBA application. The CORBA support module (110) provides support for writing the IDL file in an editor (112) or generating the IDL file from various templates (114). The IDL file is then compiled using an IDL Compiler (118) into constructs in a target computer language, such as classes in Java™. The support module (110) also provides support for editing or generating client and server main and implementation classes. Further, the CORBA support module (110) includes browsers for interface repository and name service (113), a POA support component (115), and a CORBA wizard component (119).

An important part of the CORBA support module (110) of the Forte™ for Java™ IDE is an Implementation Generator (116). After writing the IDL file, the developer implements all interfaces that are written to the IDL file. The support module (110) assists the developer with this task through the medium of the Implementation Generator (116). Using the Implementation Generator (116), the developer can generate a basic implementation (i.e., an implementation with empty method body) for all interfaces from the IDL file. During the generation of the implementation, customizable options are available of certain setup properties (e.g., generation of method bodies, etc.).

Figure 8:
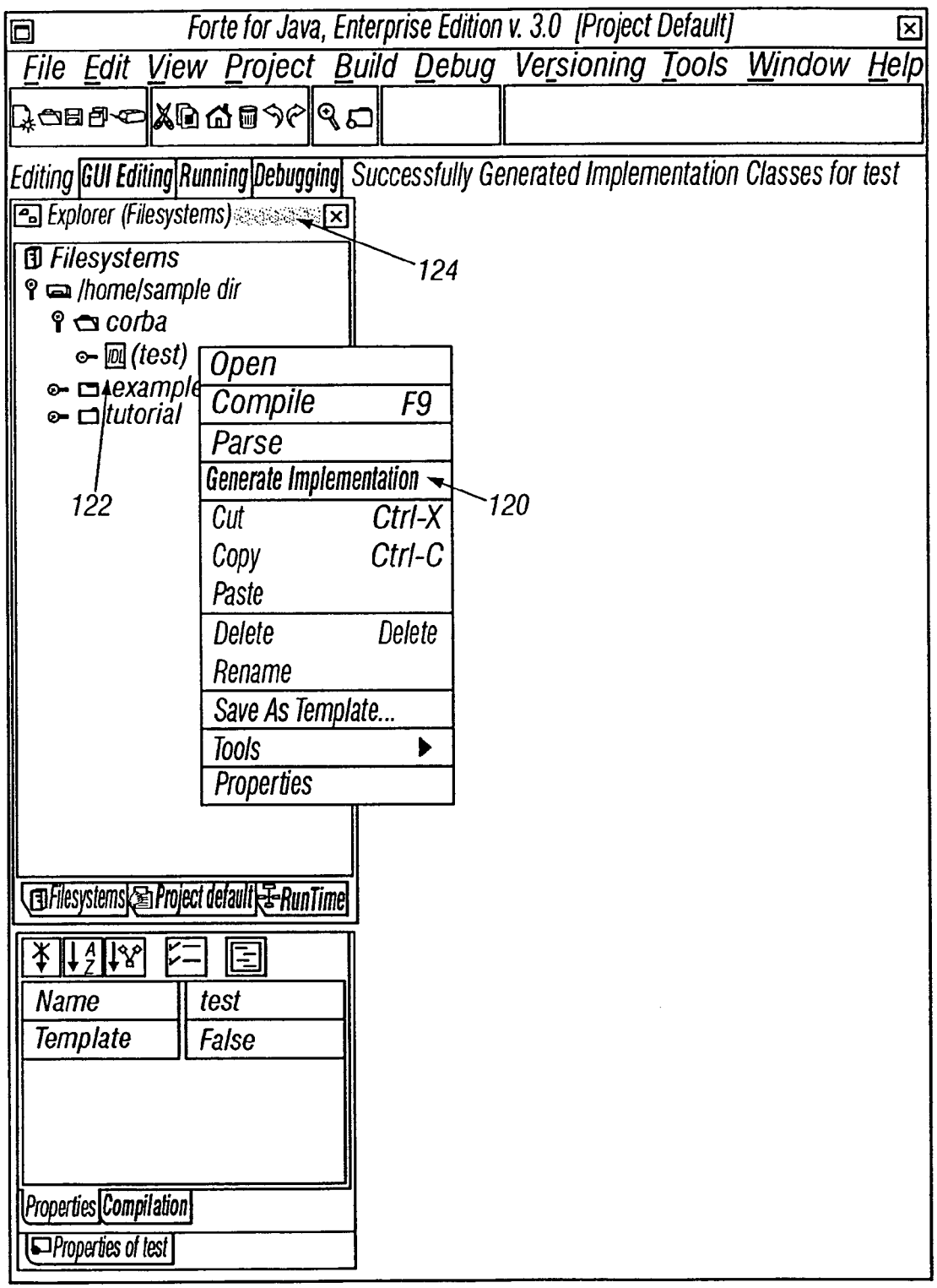
FIG. 8 illustrates a computer screen shot of the Explorer window within an IDE in accordance with one or more embodiments of the present invention.
Figure 9:
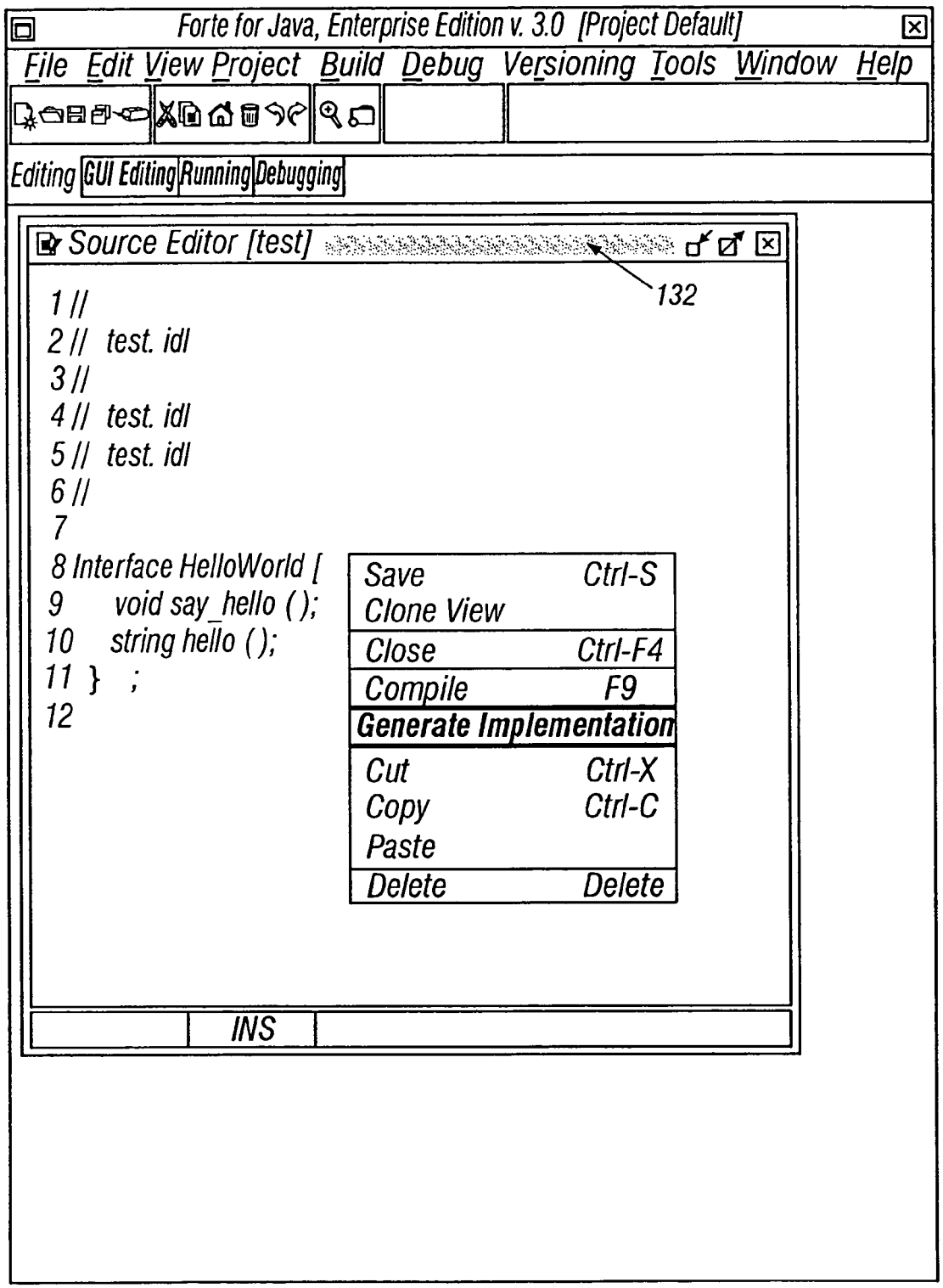
FIG. 9 illustrates a computer screen shot of the Source Editor window within an IDE in accordance with one or more embodiments of the present invention.

The Implementation Generator is activated either by selecting the "Generate Implementation" menu item (120) in a standard pop-up menu from within the IDL Node (122) in the Explorer (124) as shown in FIG. 8, or by selecting the Generate Implementation menu item in a standard pop-up menu in the a source editor (132) as shown in FIG. 9. The result is source code in the source editor within the IDE in Java™ language.

In certain circumstances, the Implementation Generator is required to resolve inheritance issues. The present invention involves a method of supporting multiple object inheritance in a language that does not natively support multiple inheritance, such as Java™. One skilled in the art will appreciate that many object oriented languages do not support multiple inheritance. The method implemented in place of inheritance (multiple or single) is delegation of an inherited method into a method of the parent implementation. In accordance with one or more embodiments of the present invention, Forte™ for Java™ IDE supports generation of full delegation code for implementation of IDL interface that extends parent(s).

Figure 10:
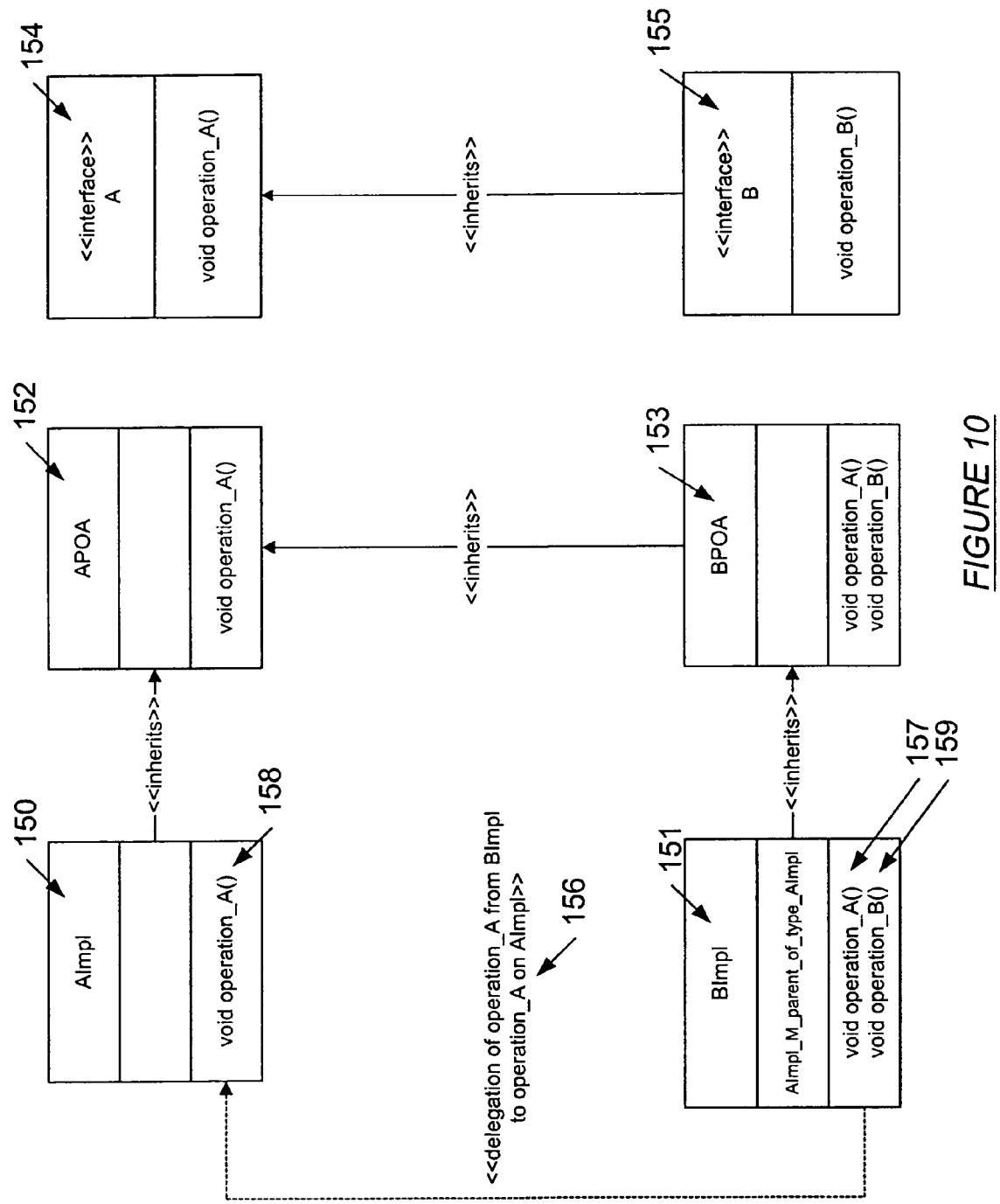
FIG. 10 is a block diagram illustrating single inheritance through delegation in accordance with one or more embodiments of the present invention.

Single inheritance through delegation in accordance with one or more embodiments of the present invention is shown in FIG. 10. The interfaces are defined in the IDL as interface A (154) and interface B (155). The Forte™ for Java™ IDE implementation generator generates implementation classes AImpl and BImpl. The implementation code is generated in the form of classes AImpl (150) and BImpl (151). BImpl (151) contains a reference to an object of type AImpl (150) and indirectly implements operation_A( ) (157) by calling the implementation of operation_A( ) (158) in object AImpl (150). Thus, the implementation of operation_A( ) (157) is delegated to the object AImpl (150) referenced by object BImpl (151). Operations operation_A (158) in AImpl (150) and operation_B (159) in BImpl (151) are with empty bodies so the developer adds functionality to these operations. However, operation_A (157) in BImpl (151) has body, which uses delegation to operation_A in instance of AImpl (150) to provide its functionality.

Figure 11:
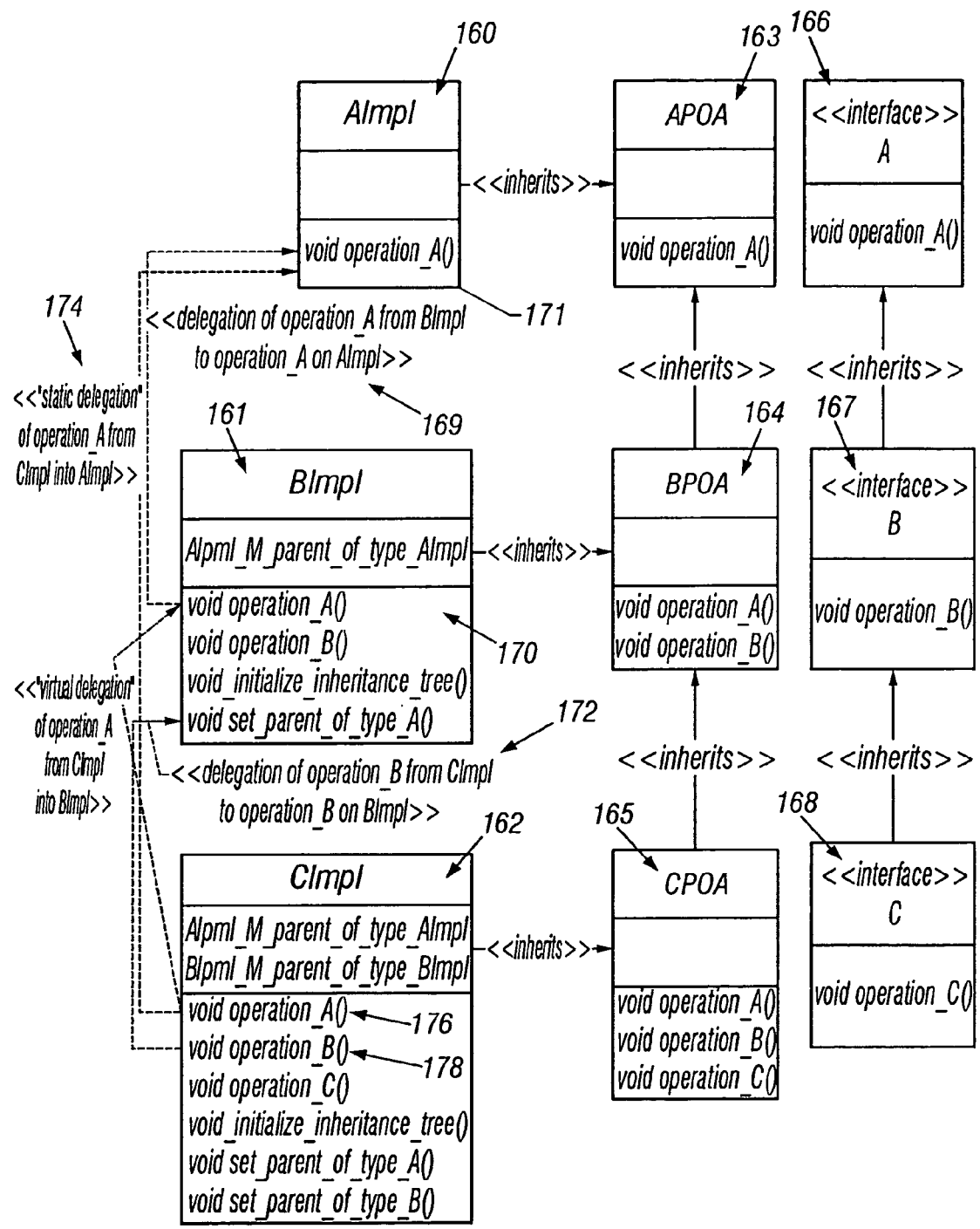
FIG. 11 is a block diagram illustrating more complex example of single inheritance through delegation in accordance with one or more embodiments of the present invention.

A more complex case of inheritance through delegation in accordance with one or more embodiments of the present invention is shown in FIG. 11. The interfaces are defined in the IDL as interface A (166), interface B (167), and interface C (168). The Forte™ for Java™ IDE implementation generator generates the implementation code in the form of classes AImpl (160), BImpl (161), and CImpl (162). BImpl (161) contains a reference to an object of type AImpl (160) and indirectly implements operation_A( ) (170) by calling the implementation of operation_A( ) (171) in object AImpl (160). Thus, the implementation of operation_A( ) (170) is delegated to the object AImpl (160) referenced by object BImpl (161). Object CImpl (162) contains a reference to objects of type AImpl (160) and a reference to objects of type BImpl (161). Object CImpl indirectly implements operation_B( ) (178) by calling the implementation of operation_B( ) in object BImpl (161). Object CImpl (162) indirectly implements operation_A( ) (176). If static delegation is used, then operation_A( ) (176) is implemented by calling the implementation of operation_A( ) (171) in object AImpl (160). If virtual delegation is used, then operation_A( ) (176) is implemented by calling the implementation of operation_A( ) (170) in object BImpl (161).

Figure 12:
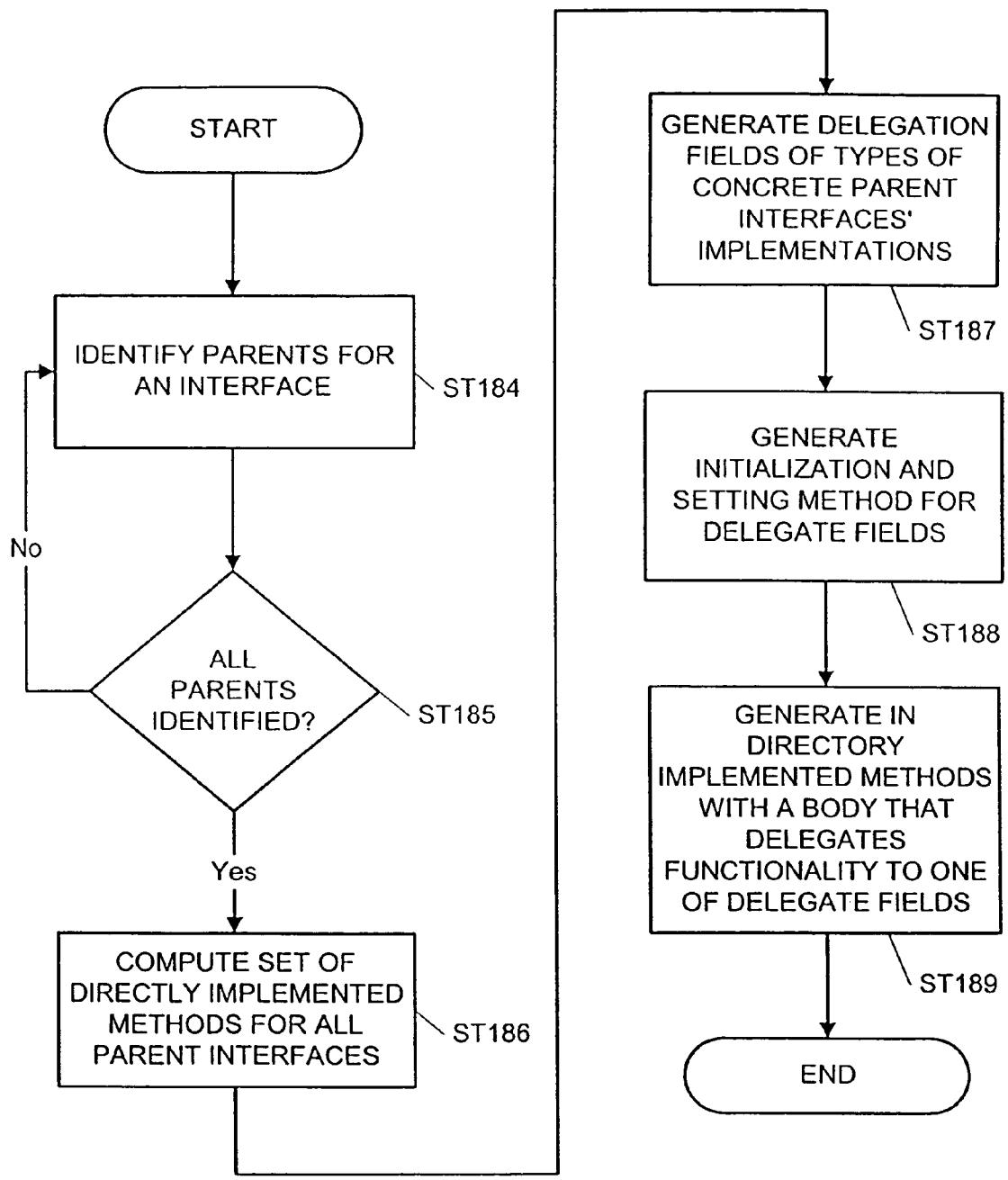
FIG. 12 illustrates a flowchart for generating an implementation for an IDL interface.

The implementation generator generates implementation for IDL interface with parent(s) and inheritance using the following method as shown in FIG. 12. First, all parents are identified for an interface (Step 184). Once all parents are identified (Step 185), a set of directly implemented methods is computed for all parent interfaces, including the interface above (Step 186). The delegation fields of types of concrete interfaces' implementations are then generated into an implementation of the interface (Step 187). Next, initialization and settings method are generated for the delegation fields (Step 188). Lastly, non-directly implemented methods with a body that delegates functionality to one of the delegate fields (an instance) are generated (Step 189). The specifics of the generation of non-directly implemented methods depends heavily on the type of delegation chosen.

In accordance with one or more embodiments of the present invention, implementation of inheritance support for the implementation generator component within the CORBA Support Module has three delegation settings, including a none setting, a Static Delegation setting, and a Virtual Delegation setting. The none setting uses a default Forte™ for Java™ IDE implementation generator. The Static Delegation setting enables methods to call methods directly on the object that directly implements the delegated methods. The Virtual Delegation setting enables methods to call methods on the most derived object that implements the delegated method.

A typical IDL file defining interface A and interface B, which inherits from interface A is shown below.

```
interface A {
    void op ( );
};
interface B : A {
    void op2 ( );
};
```

A typical implementation generated by a developer using Forte™ for Java™ IDE implementation generator creates two files (AImpl.java and BImpl.java) is shown below.

```
/*
 * This file was generated from inher1.idl
 */
package idls_local.newFeatures;
class AImpl extends idls_local.newFeatures._AImplBase {
    public void op( ) {
        throw new UnsupportedOperationException ( );
    }
}
/*
 * This file was generated from inher1.idl
 */
package idls_local.newFeatures;
class BImpl extends idls_local.newFeatures._BImplBase {
    public void op( ) {
        throw new UnsupportedOperationException ( );
    }
    public void op2( ) {
        throw new UnsupportedOperationException ( );
```

Figure 13:
FIG. 13 illustrates a computer screen shot within an IDE in accordance with one or more embodiments of the present invention.

In accordance with one or more embodiments of the present invention, full bodies are generated for inherited methods where the methods are delegated to embedded implementation of a parent interface. When the typical IDL file defining interface A and interface B above is generated with the implementation generator using delegation, a class AImpl is generated as source code (180) in a source editor as shown in FIG. 13 and a class BImpl is generated as source code (182) in a source editor as shown in FIG. 14.

To help preserve integrity, inherited (delegated) methods and required fields may be generated to the guarded blocks so the developer is not able to change the method or required fields. Once the guarded blocks are implemented, the only way to change the source code is to make changes to the IDL file.

A "full body implementation" requires generation of delegation source code, creation of a delegated object attribute, and creating of an _initialize_inheritance_tree method. For delegation of certain classes, an initialized instance field(s) of the type of a parent(s) implementation(s) is needed. The instance fields are generated in a certain implementation for all parents even for parents of parent, e.g., three interfaces A, B, and C where B inherits from A and C inherits from B. In the implementation of C (in class CImpl) a field of type BImpl (implementation for interface B) and a field of type AImpl (implementation for interface A) are generated.

To properly initialize these delegation fields a particular method is generated. This method is usually named "_initialize_inheritance_tree" and is responsible for proper initialization of delegation fields. The method uses a setter method for setting the parent's instances for the certain implementation.

Next, the initialization method is called from a constructor and a default constructor is generated with a full method body resulting in the implementation of the IDL file shown in FIGS. 13 and 14.

After generating all the helper methods and fields, delegation methods with full body can be generated where these methods call methods of the same name on the certain parent instance.

IDL Abstract Interfaces are intended for situations where, at compile time, it is unknown whether an object will be passed by reference or by value.

Interfaces that inherit from an abstract parent are unable to embed implementation of the abstract interface. Therefore, the implementation is unable to have full method bodies (i.e., only empty bodies are possible) making generation of delegation for abstract interfaces more complex.

The following IDL file example will assist explaining the method of generating delegation for abstract interfaces:

```
// abstract_interface.idl
//
// Created on November 20, 2000, 10:49 AM
// by kgardas
//
abstract interface Printable {
    void print ( );
};
interface HelloWorld : Printable {
    attribute string msg;
    //string msg ( );
};
interface Demo : HelloWorld {
    void run ( );
};
interface XX : Demo {
};
```

The implementation generator delegates a method print to the concrete (non-abstract) interfaces. The possible delegations are none, static and virtual. None delegation causes nothing dramatic to happen. The generator generates empty methods print for all implementations for all concrete interfaces. In case of other delegation types the implementation of interface HelloWorld directly implements operation print from its parent Printable, so the developer has to write implementation for this operation. The implementation of interface Demo delegates operation print into implementation of its parent HelloWorld. Only generation of implementation of interface XX differs for static and virtual delegation. In case of static delegation, implementation of interface XX delegates its operation print into the implementation which directly implements this operation. This is the implementation of interface HelloWorld. In case of virtual delegation, implementation of interface XX delegates its operation print into the implementation of the most derived parent. This is the implementation of interface Demo.

In case that an interface directly inherits from an abstract interface, the implementation class of this interface generated by the Implementation Generator has methods defined by the abstract interface generated with empty bodies. For instance, as the interface Demo inherits from Printable twice (directly and indirectly via HelloWorld interface), the method "print" generated to the implementation of interface Demo has an empty body.

```
// abstract_interface.idl
//
// Created on November 20, 2000, 10:49 AM
// by kgardas
//
abstract interface Printable {
    void print ( );
};
interface HelloWorld : Printable {
    attribute string msg;
    //string msg ( );
};
interface Demo : HelloWorld, Printable {
    void run ( );
};
interface XX : Demo {
};
```

Figure 15:
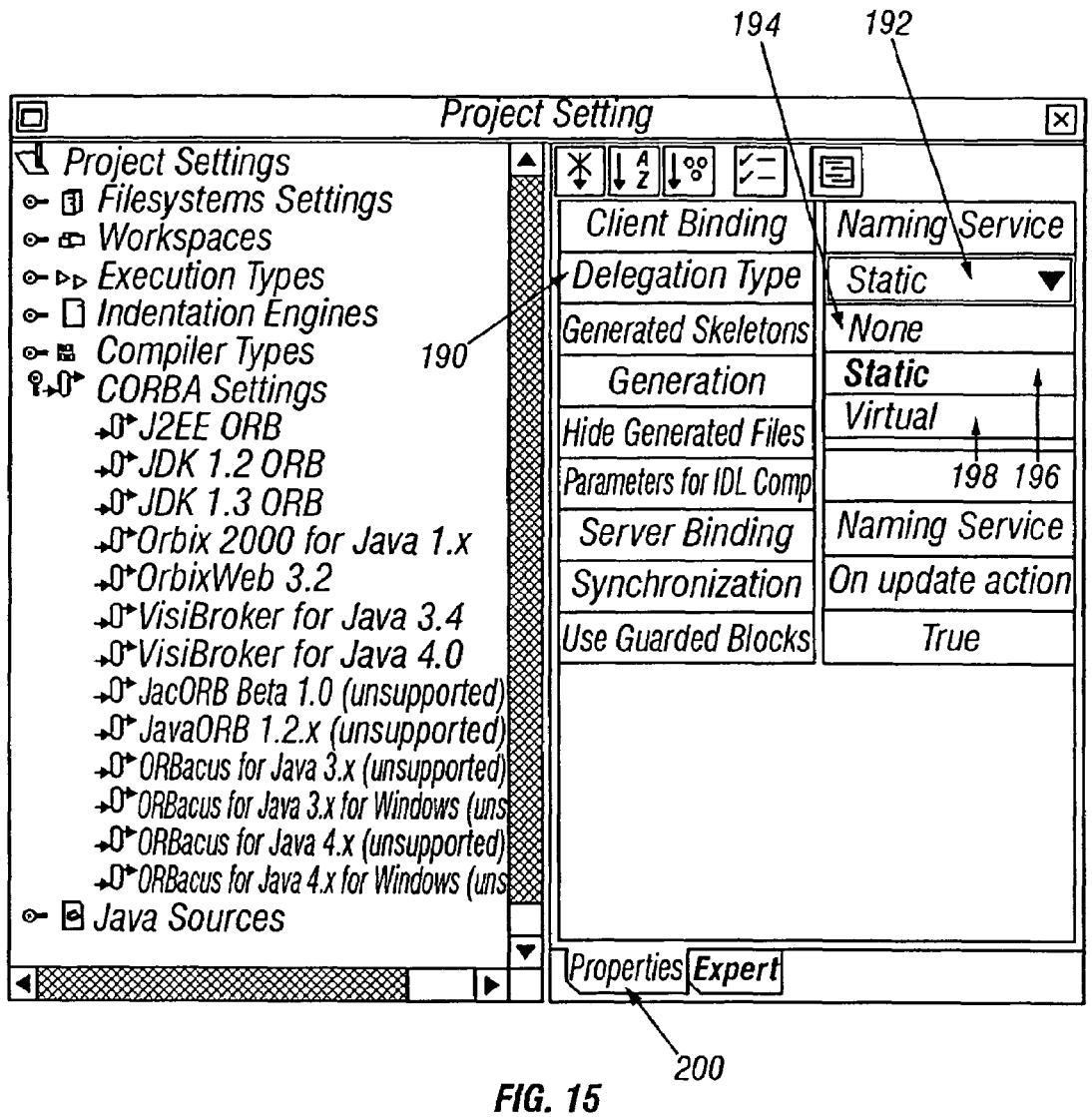
FIG. 15 illustrates a computer screen shot within an IDE in accordance with one or more embodiments of the present invention.
Figure 16:
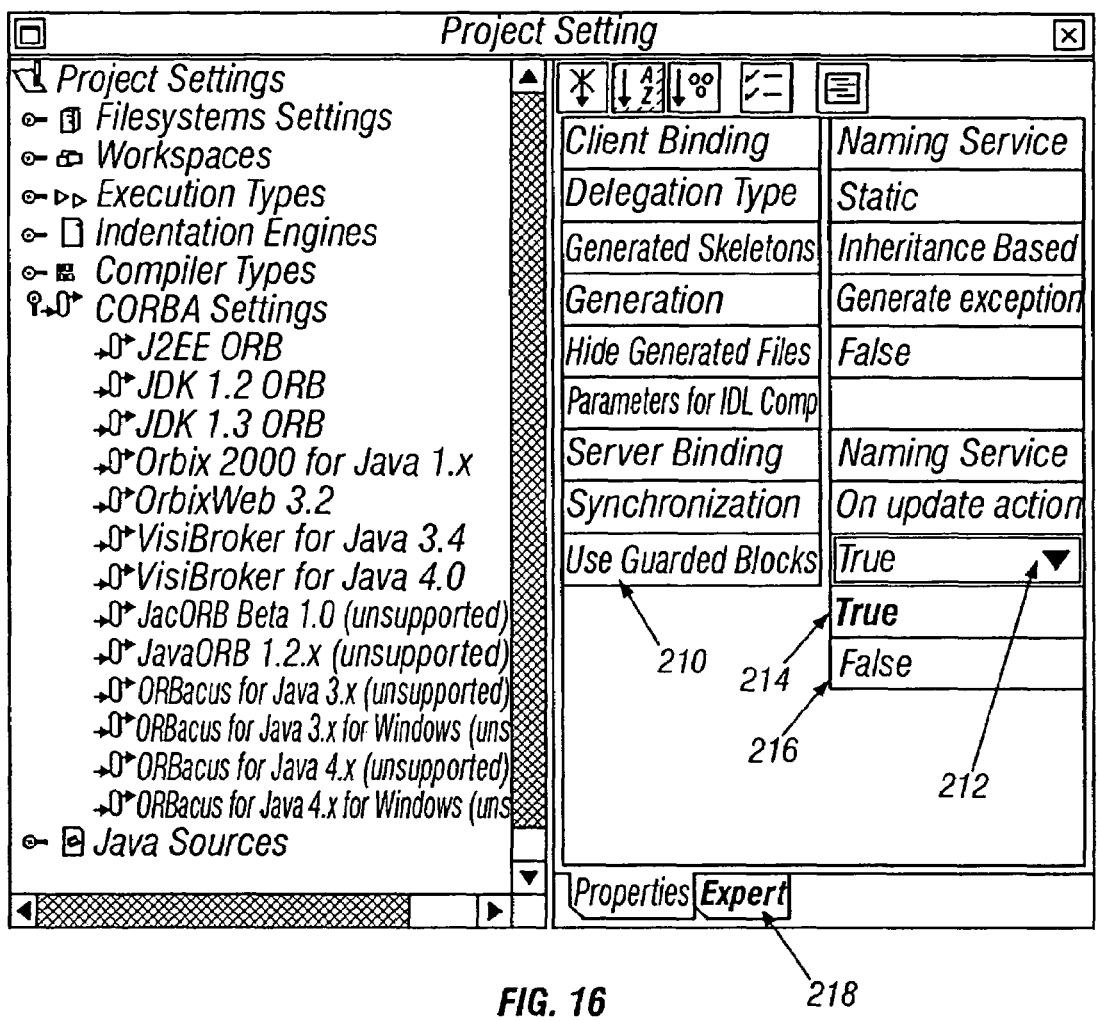
FIG. 16 illustrates a computer screen shot within an IDE in accordance with one or more embodiments of the present invention.

Properties of the CORBA Support Settings and some additional properties of the expert properties of these settings have been added. The two main added properties are for defining delegation type and defining guarded blocks usage. FIG. 15 shows a dialog box containing various project settings with the properties tab (200) showing interface generation options. Specifically, the Delegation Type option (190) may be selected by using a standard drop down box (192) that lists the available options of None (194), Static (196), and Virtual (198). The currently selected option is highlighted (196) and displayed in the drop down box (192). FIG. 16 shows a dialog box containing various project settings with the expert tab (218) showing expert interface generation options. The Use Guarded Blocks option (210) may be selected by using a drop down box (212), which lists the available options of True (214) and False (216). The currently selected option is highlighted (214) and displayed in the drop down box (212).

Advantages of the present invention may include one or more of the following. The delegation of inherited methods into the method of a parent implementation is supported. Full delegation code for implementation of IDL interface can be generated. Those skilled in the art will appreciate that the present invention may include other advantages and features.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of generating an inheriting interface definition language (IDL) interface, comprising:
    identifying a plurality of parents for the inheriting IDL interface, wherein the inheriting IDL interface inherits directly from each of a plurality of parent interfaces corresponding to the plurality of parents;
    identifying the plurality of parent interfaces associated with the plurality of parents, wherein the plurality of parent interfaces comprise a plurality of concrete parent interfaces;
    computing a set of directly implemented methods for the plurality of parent interfaces;
    generating an implementation of the inheriting IDL interface with the plurality of concrete parent interfaces to generate a plurality of delegation fields, wherein the plurality of delegation fields create an instance for each of the plurality of parents in the implementation of the inheriting IDL interface;
    generating an initialization method and a setting method for each of the plurality of delegation fields in the implementation of the inheriting IDL interface; and
    generating indirectly implemented methods with a body that delegates functionality to one of the plurality of delegation fields, wherein the indirectly implemented method calls a corresponding directly implemented method in the plurality of parent interfaces using the one of the plurality of delegation fields,
    wherein generating the body comprises generating a full body implementation for each of the plurality of indirectly implemented methods, wherein the full body implementation comprises delegation source code, a delegation object attribute, and an initialize inheritance tree method.

2. The method of claim 1, wherein generating the plurality of indirectly implemented methods comprises using a delegation type.

3. The method of claim 1, wherein the plurality of indirectly implemented methods are generated to guarded blocks.

4. A method of generating an inheriting interface definition language (IDL) interface, comprising:
    identifying a plurality of parents for the inheriting IDL interface, wherein the inheriting IDL interface inherits directly from each of a plurality of parent interfaces corresponding to the plurality of parents;
    identifying the plurality of parent interfaces associated with the plurality of parents, wherein the plurality of parent interfaces comprise a plurality of concrete parent interfaces;
    computing a set of directly implemented methods for the plurality of parent interfaces;
    generating an implementation of the inheriting IDL interface with the plurality of concrete parent interfaces to generate a plurality of delegation fields, wherein the plurality of delegation fields create an instance for each of the plurality of parents in the implementation of the inheriting IDL interface;
    generating an initialization method and a setting method for each of the plurality of delegation fields in the implementation of the inheriting IDL interface; and
    generating indirectly implemented methods with a body that delegates functionality to one of the plurality of delegation fields, wherein the indirectly implemented method calls a corresponding directly implemented method in the plurality of parent interfaces using the one of the plurality of delegation fields,
    wherein the indirectly implemented methods are generated to guarded blocks,
    wherein generating the body comprises generating a full body implementation for each of the indirectly implemented methods, wherein the full body implementation comprises delegation source code, a delegation object attribute, and an initialize inheritance tree method, and
    wherein the type of delegation is one selected from the group consisting of none, static delegation, and virtual delegation.

5. A computer system adapted to generate an inheriting interface definition language (IDL) interface, comprising:
    a processor;
    a memory element, and
    software instructions for enabling the computer under control of the processor, to perform:
        identifying a plurality of parents for the inheriting IDL interface, wherein the inheriting IDL interface inherits directly from each of a plurality of parent interfaces corresponding to the plurality of parents;
        identifying the plurality of parent interfaces associated with the plurality of parents, wherein the plurality of parent interfaces comprises a plurality of concrete parent interfaces;
        computing a set of directly implemented methods for the plurality of parent interfaces;
        generating an implementation of the inheriting IDL interface with the plurality of concrete parent interfaces to generate a plurality of delegation fields, wherein the plurality of delegation fields create an instance for each of the plurality of parents in the implementation of the inheriting IDL interface;
        generating an initialization method and a setting method for each of the plurality of delegation fields in the implementation of the inheriting IDL interface; and
        generating indirectly implemented methods with a body that delegates functionality to one of the delegation fields, wherein the indirectly implemented method calls a corresponding directly implemented method in the plurality of parent interfaces using the one of the plurality of delegation fields,
        wherein generating the body comprises generating a full body implementation for each of the plurality of indirectly implemented methods, wherein the full body implementation comprises delegation source code, a delegation object attribute, and an initialize inheritance tree method.

6. The system of claim 5, wherein generating the plurality of indirectly implemented methods comprises using a delegation type.

7. The system of claim 5, wherein the plurality of indirectly implemented methods are generated to guarded blocks.

8. A system for generating an implementation for an inheriting interface definition language (IDL) interface, comprising:
- means for identifying a plurality of parents for the inheriting IDL interface, wherein the inheriting IDL interface inherits directly from each of a plurality of parent interfaces corresponding to the plurality of parents;
- means for identifying the plurality of parent interfaces associated with the plurality of parents, wherein the plurality of parent interfaces comprise a plurality of concrete parent interfaces;
- means for computing a set of directly implemented methods for the plurality of parent interfaces;
- means for generating an implementation of the inheriting IDL interface with the concrete parent interfaces to generate a plurality of delegation fields, wherein the plurality of delegation fields create an instance for each of the plurality of parents in the implementation of the inheriting IDL interface;
- means for generating an initialization method and a setting method for each of the plurality of delegation fields in the implementation of the inheriting IDL interface; and
- means for generating indirectly implemented methods with a body that delegates functionality to one of the plurality of delegation fields, wherein the indirectly implemented method calls a corresponding directly implemented method in the plurality of parent interfaces using the one of the plurality of delegation fields,
- wherein means for generating the body comprises generating a full body implementation for each of the plurality of indirectly implemented methods, wherein the full body implementation comprises delegation source code, a delegation object attribute, and an initialize inheritance tree method.

9. The system of claim 8, wherein the plurality of indirectly implemented methods are generated to guarded blocks.

10. A method for generating an inheriting interface definition language (IDL) interface comprising:
- generating at least one directly implemented method for each of a plurality of parent interfaces, wherein the inheriting IDL interface inherits directly from each of the plurality of parent interfaces corresponding to the plurality of parents;
- determining a plurality of inheritance relationships among the plurality of parent interfaces;
- generating at least one delegation field using the plurality of inheritance relationships, wherein the plurality of delegation fields create an instance for each of the plurality of parents in the implementation of the inheriting IDL interface;
- determining a type of delegation to apply to the at least one delegation field;
- generating at least one delegation method configured to delegate control to the at least one delegation field in manner defined by the type of delegation, wherein the delegation method calls a corresponding method in a corresponding parent interface using the at least one delegation field,
- wherein the at least one delegation field to which control is delegated is determined using the at least one inheritance relationship,
- wherein generating the body comprises generating a full body implementation for each of the plurality of indirectly implemented methods, wherein the full body implementation comprises delegation source code, a delegation object attribute, and an initialize inheritance tree method.

11. The method of claim 10, wherein the type of delegation is one selected from the group consisting of none, static delegation, and virtual delegation.

12. The method of claim 10, wherein generating the at least one delegation method comprises generating a full body if the at least one delegation method is configured to delegate control to the at least one delegation field comprising an embedded implementation of a corresponding one of the plurality of parent interfaces.

13. The method of claim 10, wherein the at least one delegation method is generated to a guard block.

14. The method of claim 10, wherein generating the at least one delegation method comprises generating an empty body if the at least one delegation method is configured to delegate control to the at least one delegation field associated with one of the plurality of parent interfaces, wherein the one of the plurality of parent interfaces is an abstract interface.

* * * * *

UNITED STATES PATENT AND TRADEMARK OFFICE
CERTIFICATE OF CORRECTION

PATENT NO.       : 7,735,015 B2
APPLICATION NO.  : 10/883104
DATED            : June 8, 2010
INVENTOR(S)      : Karel Gardas et al.

It is certified that error appears in the above-identified patent and that said Letters Patent is hereby corrected as shown below:

On the face page, in field (56), in column 2, under "Other Publications", line 1, delete "Tranactions" and insert -- Transactions --, therefor.

On the face page, in field (56), in column 2, under "Other Publications", line 2, delete "Sytems;" and insert -- Systems; --, therefor.

On the face page, in field (56), in column 2, under "Other Publications", line 5, delete "intermeddiate" and insert -- intermediate --, therefor.

Figure 5:
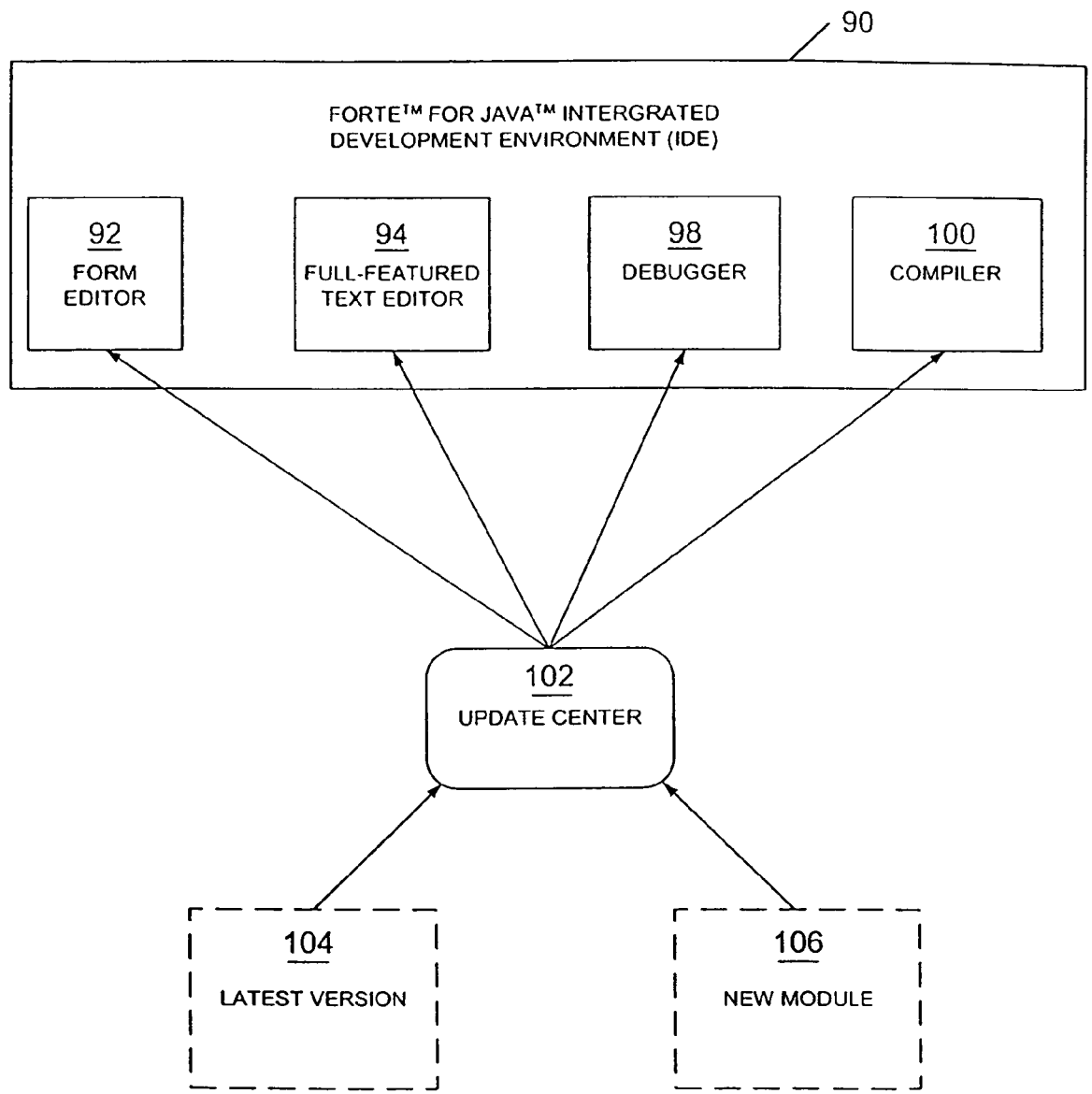
FIG. 5 illustrates an Integrated Development Environment (IDE).

On sheet 5 of 16, in Figure 5, line 2, delete "INTERGRATED" and insert -- INTEGRATED --, therefor.

On sheet 14 of 16, in Figure 14, line 13, delete "genarator." and insert -- generator. --, therefor.

In column 6, line 57, delete "been-created" and insert -- been created --, therefor.

Signed and Sealed this
Twelfth Day of July, 2011

David J. Kappos
*Director of the United States Patent and Trademark Office*